United States Patent [19]

Washizu et al.

[11] Patent Number: 4,991,867
[45] Date of Patent: Feb. 12, 1991

[54] REAR SUSPENSION SYSTEM FOR AN AUTOMOTIVE VEHICLE

[75] Inventors: Shoichi Washizu; Yoshimitsu Kobayashi; Hideo Shimada, all of Tokyo, Japan

[73] Assignee: Fuji Jukogyo Kabushiki Kaisha, Tokyo, Japan

[21] Appl. No.: 505,998

[22] Filed: Apr. 9, 1990

[30] Foreign Application Priority Data

Apr. 12, 1989 [JP] Japan .................................. 64-92632

[51] Int. Cl.$^5$ .............................................. B60G 3/20
[52] U.S. Cl. .................................... 280/690; 280/673; 280/675
[58] Field of Search ............... 280/660, 663, 666, 673, 280/675, 688, 690, 691, 693, 696, 698, 701

[56] References Cited

U.S. PATENT DOCUMENTS

| 4,621,830 | 11/1986 | Kanai ................................... 280/690 |
| 4,671,532 | 6/1987 | Matschinsky et al. .............. 280/666 |
| 4,744,587 | 5/1988 | Vereau ................................. 280/690 |
| 4,765,647 | 8/1988 | Kondo et al. ........................ 280/690 |
| 4,786,074 | 11/1988 | Muramatsu ......................... 280/690 |
| 4,887,839 | 12/1989 | Yoshimoto ......................... 280/673 |

FOREIGN PATENT DOCUMENTS

| 62-110507 | 5/1987 | Japan ................................. 280/660 |
| 2174961 | 11/1986 | United Kingdom ............... 280/691 |

Primary Examiner—Charles A. Marmor
Assistant Examiner—Karin Tyson
Attorney, Agent, or Firm—Beveridge, DeGrandi & Weilacher

[57] ABSTRACT

An improved rear suspension system for an automotive vehicle of the type including a T-shaped front lower arm and a rear lower arm is disclosed. The rear suspension sytem includes a first pivotal point pivotally supported on a vehicle body via a bush, a second pivotal point pivotally supported on a supply member and a third pivotal point pivotally supported on the vehicle body. The third pivotal point is located inwardly from a line extending through the second pivotal point and an intersection defined by an extension line extending from a center line of the rear lower arm and a central plane of the rear wheel. A ratio of a longitudinal spring constant of the bush to a lateral spring constant thereof is smaller than a ratio of a tangent of an angle defined by a line extending through the third pivotal point and the first pivotal point as well as a lateral axis of the vehicle to a tangent of an angle defined by a line extending through the third pivotal point and the second pivotal point as well as a longitudinal axis of the vehicle.

2 Claims, 3 Drawing Sheets

REAR SUSPENSION SYSTEM FOR AN AUTOMOTIVE VEHICLE

BACKGROUND OF THE INVENTION

1. Technical Field of the Invention

The present invention relates generally to a rear suspension system for an automotive vehicle. More particularly, the present invention relates to an improvement of the rear suspension system which assures an improved drivability of the vehicle.

2. Description of the Prior Art

As is well known, a strut type rear suspension has been heretofore used for an automotive vehicle. The suspension includes two lateral links spaced away from each other in the longitudinal direction of the vehicle and a strut for supporting a rear wheel. A typical example of the foregoing type of rear suspension is disclosed in an official gazette of Japanese Laid-Open Patent No. 153422/1979.

With such a conventional rear suspension, when force $F_B$ in the rearward direction is exerted on a rear wheel, as shown in FIG. 7, bushes of elastomeric material, e.g., rubber fitted at opposite ends of a front lateral link receive force $P_1$ in the outward direction of a vehicle body. To the contrary, bushes of elastomeric material, e.g., rubber fitted at opposite ends of a rear lateral link receive force $P_2$ in the inward direction of the vehicle body. This leads to a problem that toe-out tends to occur with the rear wheel, resulting in incomplete drivability.

A proposal has been made to solve the foregoing problem. Specifically, in the same structure in FIG. 7, the distance between the pivotal points on the wheel side is shorter than that of the vehicle body side. Therefore, the front link inclines as the inside end comes to more front than the outside end. For reference, this is similar to the line AF shown in FIG. 1. In this case, the rear link inclines traversely. Another proposal has been made such that the front lateral link is shorter than the rear lateral link.

The present invention has been made in the same technical concept as that of the aforementioned proposals.

SUMMARY OF THE INVENTION

An object of the present invention is to provide a rear suspension system for an automotive vehicle wherein a rear wheel can maintain constant toe-in characteristics even when force toward the rearward direction is exerted on the rear wheel.

The present invention provides a rear suspension system for an automotive vehicle including a rear wheel, a support member for rotatably supporting the rear wheel and a rear lower arm having one end pivotally supported on a vehicle body and the other end pivotally supported on the vehicle body at a rearward portion with a center of the rear wheel, wherein the rear suspension system further includes a T-shaped front lower arm provided with a lateral arm portion disposed parallel to the rear lower arm and a forward arm portion extending forwardly from an intermediate part of the lateral arm portion, the lateral arm portion having a first pivotal point pivotally supported on the vehicle body and a second pivotal point pivotally supported on the support member at a forward portion with the center of the rear wheel, the forward portion having a third pivotal point pivotally supported on the vehicle body via a bush, the third pivotal point being located inwardly from a line extending through the second pivotal point and an intersection defined by an extension line extending from a center line of the rear lower arm and a central plane of the rear wheel, the bush having a ratio of a longitudinal spring constant thereof to a lateral spring constant thereof, which is smaller than a ratio of a tangent of an angle defined by a line extending through the third pivotal point and the first pivotal point as well as a lateral axis of the vehicle to a tangent of an angle defined by a line extending through the third pivotal point and the second pivotal point as well as a longitudinal axis of the vehicle.

According to the present invention, when the force in the rearward direction is exerted on the rear wheel, the bush inserted into a pivotal point at the foremost end of the forward arm portion of the front lower arm is deformed and thereby the instantaneous center of turning movement of the front lower arm is displaced in the forward direction. This causes a distance between the both base ends of the front lower arm and the rear lower arm to be enlarged. Thus, displacement of the front lower arm and the rear lower arm becomes identical to movement of a trapezoidal link mechanism. Consequently, the rear suspension of the present invention assures that toe-in of the rear wheel can be maintained.

Other objects, features and advantages of the present invention will become understood from the following description referring to the accompanying drawings.

DESCRIPTION OF THE PREFERRED EMBODIMENTS

Now, the present invention will be described in detail hereinafter with reference to the accompanying drawings which illustrate preferred embodiments thereof.

First, description will be made below with reference to FIGS. 1 to 4.

Figure 1:
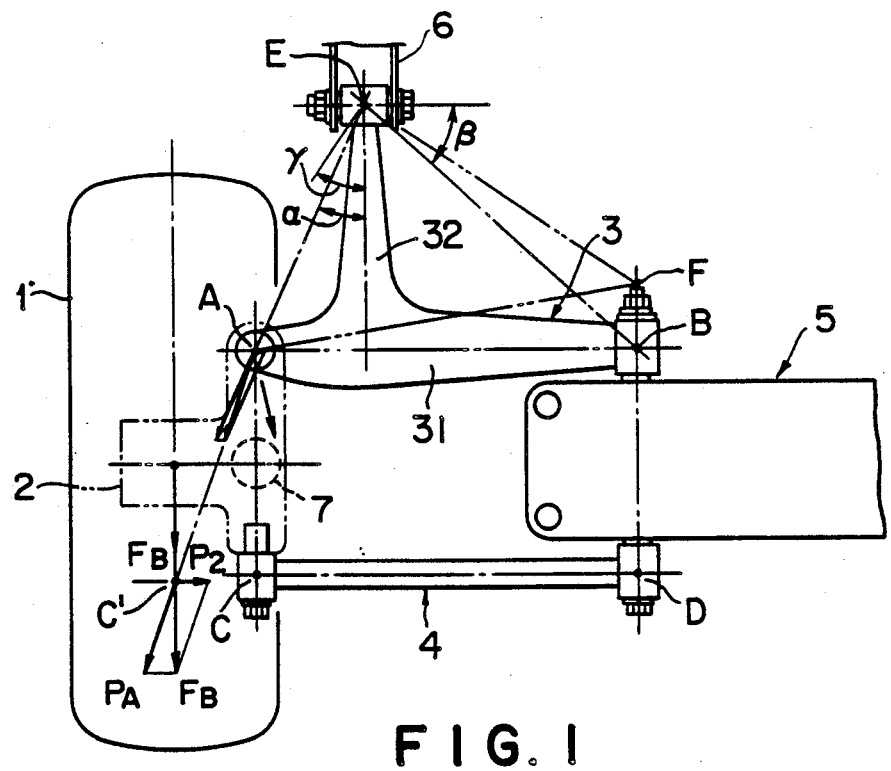
FIG. 1 is a plan view which schematically illustrates a strut type rear suspension system for an automotive vehicle in accordance with an embodiment of the present invention.

In FIG. 1, reference numeral 1 designates a rear wheel of a vehicle, reference numeral 2 designates a support member for rotatably supporting the rear wheel 1 and reference numeral 3 designates a T-shaped front lower arm. As is apparent from the drawing, the front lower arm 3 includes a lateral arm portion 31 and a forwardly extending arm portion 32 both of which are made integral with each other. The arm portion 32 extends forwardly from the intermediate part of the lateral arm portion 31. A base end of the lateral arm portion 31 is pivotally supported by a cross member 5 serving as a member on the vehicle body side at a pivotal point B, while a foremost end of the lateral arm portion 31 is also pivotally supported on the support member 2 at other pivotal point A. Further, a foremost end of the arm portion 32 is pivotally supported on a member 6 on the vehicle body side at another pivotal point E. With such arrangement, the front lower arm 3 is supported so as to swing in the vertical direction.

Reference numeral 4 designates a rear lower arm comprising a substantially I-shaped lateral arm portion. A foremost end of the rear lower arm 4 is pivotally supported on the support member 2 at a pivotal point C located rearward of a center axis of the rear wheel, while a base end of the rear lower arm 4 is also pivotally supported on the cross member 6 at other pivotal point D. Reference numeral 7 designates a conventional strut damper. An upper end of the strut damper 7 is secured to a member (not shown) on the vehicle body side so as to allow the strut damper 7 to swivel freely, while a lower end of the strut damper 7 is fastened to the support member 2.

Each of the lower arms 3 and 4 is pivotally supported via a substantially cylindrical bush made of elastomeric material, e.g., rubber.

With the rear suspension constructed as described above, the pivotal end E located at the foremost end of the forward arm portion 32 is situated inwardly of an extension line which slantwise extends through the pivotal point A at the foremost end of the lateral arm portion 32 and an intersection C' to be described later. Namely, the intersection C' is a point where an extension line extending through the pivotal point C at the foremost end of the rear lower arm 4 and the pivotal point D at the base end of the rear lower arm 4 intersects a central plane of the rear wheel 1.

Here, a ratio of a longitudinal spring constant $Ek_1$ of the rubber bush fitted at the pivotal point E to a lateral spring constant $Ek_2$ of the same rubber bush is set smaller than a ratio of a tangent of an angle $\beta$ to a tangent of an angle $\alpha$ to be described later. Namely, the angle $\beta$ is defined by a line extending through the pivotal point E and the pivotal point B and a lateral axis (Y-coordinate) of the vehicle, while the angle $\alpha$ is likewise defined by a line extending through the pivotal point E and the pivotal point A and a longitudinal axis (X-coordinate) of the vehicle. Thus, the foregoing ratio can be expressed by the following inequality.

$$\frac{Ek_1}{Ek_2} < \frac{\tan \beta}{\tan \alpha} \quad (1)$$

Figure 2:
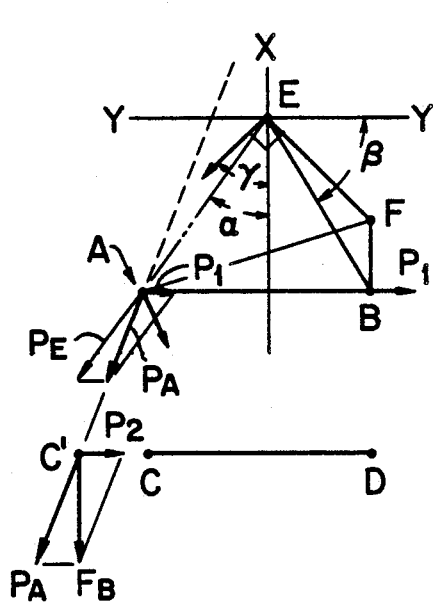
FIG. 2 is an explanatory view which illustrates a function of the rear suspension system in FIG. 1.
Figure 3:
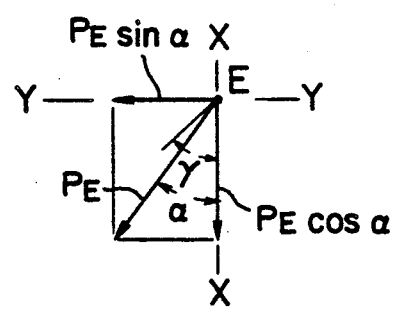
FIG. 3 is an explanatory view which illustrates a X-coordinate component and a Y-coordinate component of a load exerted on a pivotal point at the foremost end of a front lower arm.
Figure 4:
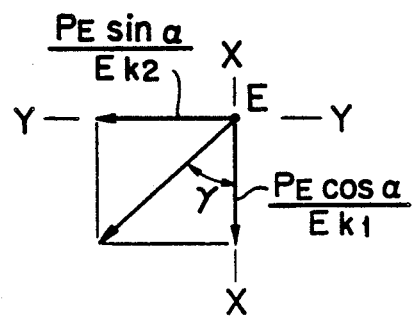
FIG. 4 is an explanatory view which illustrates the direction of displacement of the pivotal point at the foremost end of the front lower arm due to deformation of a rubber bush fitted thereto.

With the rear suspension system of the present invention, the case where a rearward load $F_B$ is exerted on a grounding point of the rear wheel 1 is shown in FIG. 1 and FIGS. 2 to 4. FIGS. 2 to 4 are explanatory views which schematically illustrate function of the rear suspension in FIG. 1, respectively. It should be noted that a plurality of angles in these drawings are shown in an exaggerated way for the purpose of easy understanding.

Since the pivotal point E is located in the above-described manner, the rearward load $F_B$ exerted on the grounding point of the rear wheel 1 is divided into two components, i.e., a load $P_A$ on the front lower arm 3 and a load $P_2$ on the rear lower arm 4. Thus, divided load $P_A$ is divided further into two components, i.e., a load $P_E$ in the direction of a line extending through the pivotal point A and the pivotal point E and a lateral load $P_1$ toward the interior of the vehicle body in the direction of a line extending through the pivotal point A and the pivotal point B.

The rubber bushes fitted at the pivotal point E and the pivotal point B are deformed by the load $P_E$ and the lateral load $P_1$, whereby the front lower arm 3 turns or swings counterclockwise in the plane shown in FIG. 1. Here, when it is assumed that an instantaneous center of turning movement of the front lower arm 3 is represented by F, the effect induced on the instantaneous center F by the lateral load $P_1$ and the load $P_E$ will be described below.

Specifically, since the direction of the lateral load $P_1$ at the pivotal point B is in substantial parallel with the lateral axis (X-coordinate) of the vehicle body, the instantaneous center F does not move to in the longitudinal direction of the vehicle. In addition, since the X-coordinate component and the Y-coordinate component of the load $P_E$ active at the pivotal point E are represented by $P_E \cos \alpha$ and $P_E \sin \alpha$, as shown in FIG. 3, and moreover the spring constant in the X-coordinate direction and the spring constant in the Y-coordinate direction of the rubber bush fitted at the pivotal point E are represented by $Ek_1$ and $Ek_2$, as described above, a quantity of displacement of the pivotal point E induced by the load $P_E$ is represented by $$\frac{P_E \sin \alpha}{Ek_2}$$

in the X-coordinate direction and $$\frac{P_E \cos \alpha}{Ek_1}$$

in the Y-coordinate direction, as shown in FIG. 4. Thus, an angle $\gamma$ defined by the direction of displacement of the pivotal point E and the X-coordinate is represented by the following equation.

$$\gamma = \tan^{-1}\left(\frac{P_E \sin \alpha}{Ek_2} \Big/ \frac{P_E \cos \alpha}{Ek_1}\right) \quad (2)$$

$$= \tan^{-1}\left(\tan \alpha \frac{Ek_1}{Ek_2}\right)$$

At this moment, since the instantaneous center F is located in the direction at a right angle relative to the direction of displacement of the pivotal point E, as shown in FIGS. 1 and 2, the instantaneous center F coincides with an intersection defined by a line extending through the pivotal point B in parallel with the X-coordinate and a line extending at right angle relative to the direction of displacement of the pivotal point E, without deformation of the rubber bush at the pivotal point B induced by the lateral force $P_1$.

The ratio $$\frac{Ek_1}{Ek_2}$$

in the inequality (1) is usable for determining the direction of displacement of the pivotal point E. The inequality (1) is transformed with respect to the angle $\beta$ as follows.

$$\beta > \tan^{-1}\left(\tan \alpha \frac{Ek_1}{Ek_2}\right) \quad (3)$$

When the inequality (3) is put in the equation (2), the following inequality is obtained.

$$\beta > \gamma \quad (4)$$

As will be apparent from the above description, since a complementary angle of the angle $\beta$, i.e., the angle defined by the X-coordinate and the line extending through the pivotal point E and the pivotal point B is smaller than the complementary angle of the angle $\gamma$, i.e., the angle defined by the X-coordinate and the line extending through the pivotal point E and the instantaneous center F, the instantaneous center F of turning movement of the front lower arm 3 is situated forwardly of the pivotal point B. In addition, since the distance between the pivotal point D and the instantaneous center F is larger than the distance between the pivotal point A and the pivotal point C, displacement of the front lower arm 3 and displacement of the rear lower arm 4 provide movement of a trapezoidal link mechanism, whereby the rear wheel 1 maintains toe-in. As a result, drivability is improved.

The present invention has been described above as to the embodiment wherein the present invention is applied to lower arms for the strut type rear suspension, but it is not limited only to this. Alternatively, it may be applied to lower arms for a Wishbone type rear suspension.

Figure 5:
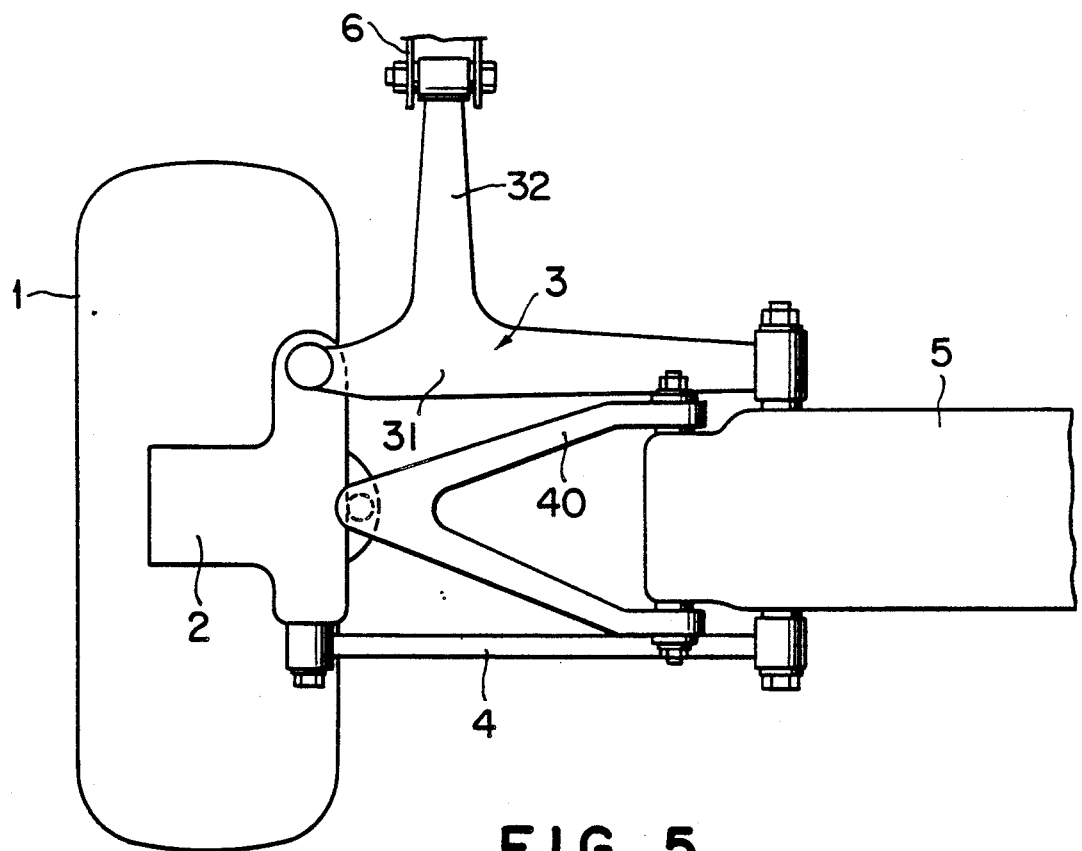
FIG. 5 is a plan view which schematically illustrates a double Wishbone type rear suspension system in accordance with another embodiment of the present invention.
Figure 6:
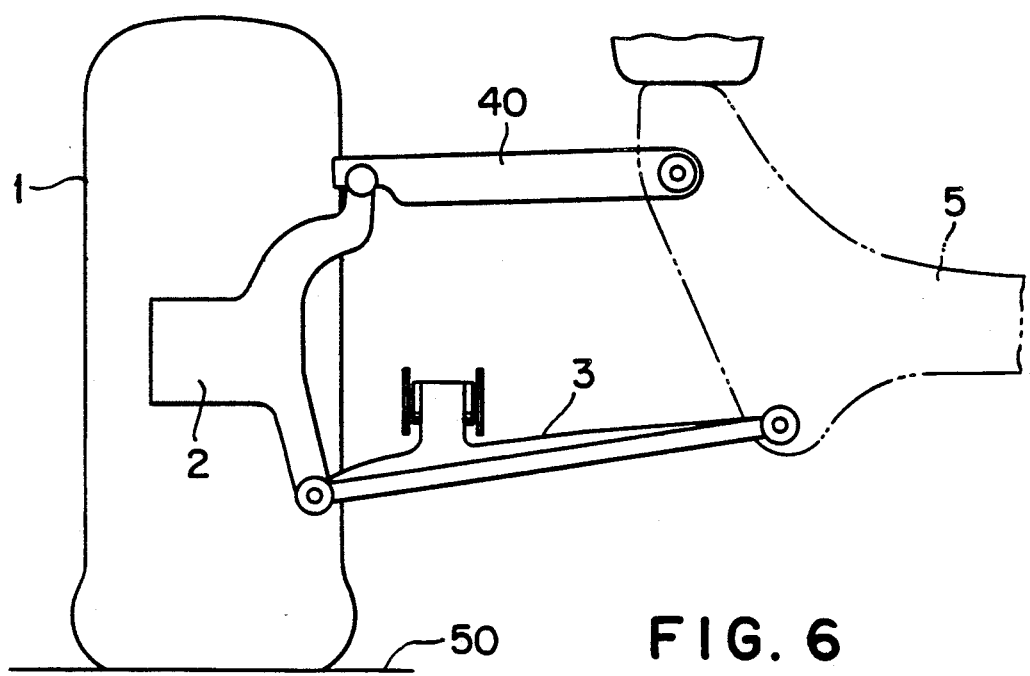
FIG. 6 is a front view of the rear suspension system in FIG. 5.
Figure 7:
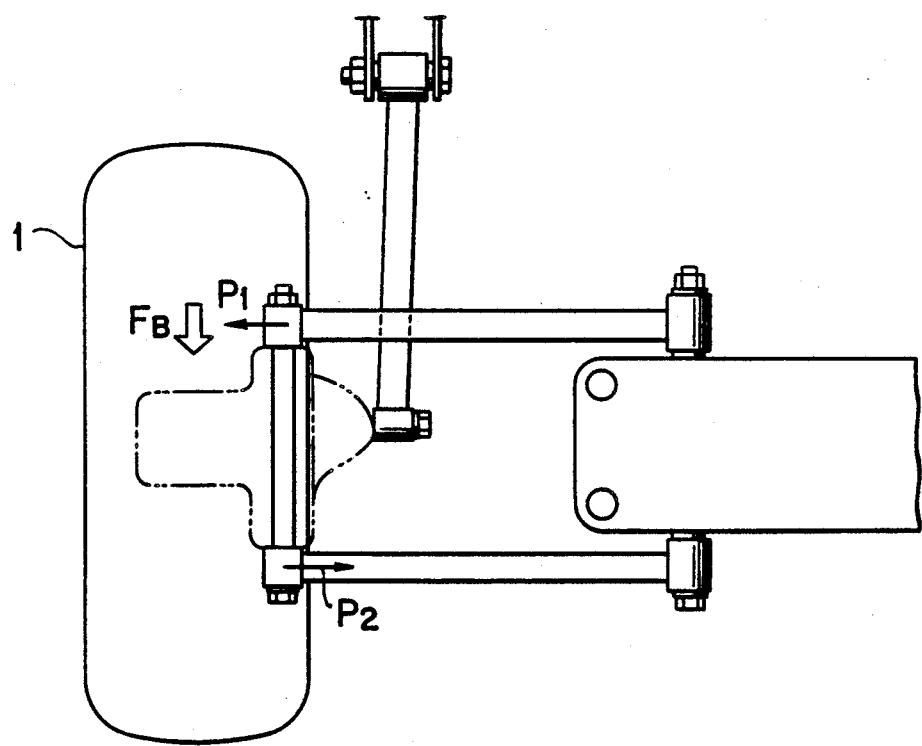
FIG. 7 is a plan view which schematically illustrates a conventional rear suspension system.

FIGS. 5 and 6 illustrates by way of example a case where the present invention is applied to a double Wishbone type rear suspension system, respectively. FIG. 5 is a plan view of the rear suspension system in according with another embodiment of the present invention and FIG. 6 is a front view of the rear suspension in FIG. 5. Basically, this rear suspension system is identical to that shown in FIG. 1 in structure, operation and function with the exception that an upper arm 40 is arranged over the front lower arm 3 and the rear lower arm 4 to connect a support member 2 and a vehicle body side to each other, as is best seen in FIG. 6. In FIG. 6, reference numeral 50 designates a ground line. It should be added that other same essential components as those shown in FIG. 1 are represented by same reference numerals.

Since the rear suspension in FIGS. 5 and 6 is substantially same to the rear suspension in FIG. 1, repeated description will not be required.

As described above, according to the present invention, a rear suspension system for an automotive vehicle including a T-shaped front lower arm comprising a lateral arm portion and a forward arm portion extending forwardly from the intermediate part of the lateral arm portion and a rear lower arm comprising a lateral arm portion only, a base end of the lateral arm portion of the front lower arm and a base end of the lateral arm portion of the rear lower arm being pivotally supported on a member on the vehicle body side, respectively, a foremost end of the lateral arm portion of the rear lower arm being pivotally supported on a support member for a rear wheel and a foremost end of the forward arm portion of the front lower arm being pivotally supported of another member on the vehicle body side, has the following two characterizing features. Namely, one of them is that a pivotal point for the forward arm portion of the front lower arm is situated inwardly of a line extending through an intersection defined by an extension line extending from a center line of the rear lower arm and a central plane of the rear wheel as well as a pivotal point for the lateral arm portion of the front lower arm pivotally supported on the support member for the rear wheel. The other one is that a ratio of a longitudinal spring constant of a rubber bush fitted at the pivotal point for the forward arm portion of the front lower arm to a lateral spring constant of the same is determined smaller than a ratio of a tangent of an angle defined by a line extending through the pivotal point for the forward arm portion of the front lower arm and the pivotal point for the lateral arm portion of the front lower arm pivotally supported on the member of the vehicle body side as well as the lateral axis of a vehicle to a tangent of an angle defined by a line extending through the pivotal point for the forward arm portion of the front lower arm and the pivotal point for the lateral arm portion of the front lower arm pivotally supported on the member for the rear wheel as well as the longitudinal axis of the vehicle.

With such construction, when force in the rearward direction is exerted on the rear wheel, the rubber bush fitted at the pivotal point for the forward arm portion of the front lower arm is deformed and thereby the instantaneous center of turning movement of the front lower arm is displaced forwardly. Consequently, a distance between the base end of the front lower arm and the base end of the rear lower arm is enlarged, whereby displacement of the both lower arms become identical to that of a trapezoidal link mechanism. This assures that toe-in of the rear wheel is maintained. As a result, drivability of the vehicle is improved substantially. Additionally, since the rear suspension of the present invention is constructed in a simple manner, it can be fabricated at an inexpensive cost.

While the presently preferred embodiments of the present invention have been shown and described, it should be understood that these disclosure are for the purpose of illustration and that various changes or modifications may be made without departure from the scope of the invention as defined by the appended claims.

What is claimed is:

1. A rear suspension system for an automotive vehicle including a rear wheel, a support member for rotatably supporting said rear wheel and a rear lower arm having one end pivotally supported on a vehicle body and the other end pivotally supported on said vehicle body at a rearward portion with a center of said rear wheel, comprising;

a T-shaped front lower arm provided with a lateral arm portion disposed parallel to said rear lower arm and a forward arm portion extending forwardly from an intermediate part of said lateral arm portion, said lateral arm portion having a first pivotal point pivotally supported on said vehicle body and a second pivotal point pivotally supported on said support member at a forward portion with the center of said rear wheel, said forward arm portion having a third pivotal point pivotally supported on said vehicle body via a bush, which is located inwardly from a line extending through the second pivotal point and an intersection defined by an extension line extending from a center line of the rear lower arm and a central plane of the rear wheel, said bush having a ratio of a longitudinal spring constant thereof to a lateral spring constant thereof, which is smaller than a ratio of a tangent of an angle defined by a line extending through the third pivotal point and the first pivotal point as well as a lateral axis of the vehicle to a tangent of an angle defined by a line extending through the third pivotal point and the second pivotal point as well as a longitudinal axis of the vehicle.

2. The rear suspension system as claimed in claim 1, wherein an upper arm is arranged over the front lower arm and the rear lower arm to connect the support member and the vehicle body to each other.

* * * * *